United States Patent [19]
Bassman
[11] Patent Number: 4,941,110
[45] Date of Patent: Jul. 10, 1990

[54] MEMORY SAVING ARRANGEMENT FOR DISPLAYING RASTER TEST PATTERNS

[75] Inventor: Robert G. Bassman, Little Ferry, N.J.
[73] Assignee: Allied-Signal, Inc., Morris Township, Morris County, N.J.

[21] Appl. No.: 266,042
[22] Filed: Nov. 2, 1988
[51] Int. Cl.[5] .......... G06F 15/62
[52] U.S. Cl. .......... 364/521; 340/723; 340/798
[58] Field of Search .......... 364/518, 521; 365/189, 365/230; 358/139; 340/721, 723, 798–800

[56] References Cited

U.S. PATENT DOCUMENTS 4,435,792 3/1984 Bechtolsheim .......... 365/230
4,628,467 12/1986 Nishi et al. .......... 364/521
4,749,990 6/1988 Birkner .......... 340/799
4,825,411 4/1989 Hamano .......... 365/230 X

*Primary Examiner*—Gary V. Harkcom
*Assistant Examiner*—H. R. Herndon
*Attorney, Agent, or Firm*—Howard G. Massung; Robert A. Walsh

[57] ABSTRACT

When displaying raster test patterns memory is saved by using comparators which allow a prediction as to which scan line contains valid display information. When a valid scan line is reached, and when the correct horizontal position on said scan line is achieved data is displayed. A Y register holds the value of a valid scan line i.e., one containing picture information and an X register holds the value of the horizontal position of the picture information. Video is provided from a shift register, the output of which is converted to an analog composite video signal. Control logic is provided to load the register.

6 Claims, 5 Drawing Sheets

MEMORY SAVING ARRANGEMENT FOR DISPLAYING RASTER TEST PATTERNS

BACKGROUND OF THE INVENTION

Prior to the present invention arrangements for displaying raster test patterns involved a relatively large bit-mapped memory, usually addressed by counters generating horizontal and vertical raster timing. For a display memory which is constantly changing this is an acceptable approach. However, for displaying simple test patterns such as, for example, a monochromatic display with two level video, i.e. on and off, much of the memory is wasted in the described prior art arrangement.

Consider, for example, the requirements for a wide field of view head-up display (HUD) as is common for avionics video test equipment. Two display modes are required: 525 lines per frame and 875 lines per frame, both at a 30 Hz refresh rate and 2:1 interlaced. In order to bit-map an 875 line screen with a required resolution of 600 pixels, a memory of 800×600 or 480,000 bits is required for a black and white (monochromatic) display (800 lines out of 875 lines are active).

Using random access memory (RAM), the overhead time for writing and checking memory for each of several test patterns is undesirable. Alternatively, the use of programmable read only memory (PROM) requires the use of considerable integrated circuitry leading to an excessive amount of board space. In order to store four unique test patterns in PROM, the required memory size would be 96K 16 bit words (2 patterns each of 480×600 and 800×600). The present invention condenses this memory to less than 512 16 bit words, while adding minimal external circuitry.

Accordingly, it is the object of the present invention to provide an arrangement for displaying raster test patterns wherein all memory included in said arrangement contains valid display information and nothing for blank screen space. That is to say, the amount of memory is proportional to the complexity of the image displayed.

SUMMARY OF THE INVENTION

This invention relates to a memory saving arrangement for displaying raster test patterns wherein memory is saved through the use of comparators which allow the arrangement to predict on which scan line there is valid display information (active video). The arrangement is such that a waiting mode is endured until a valid scan line is reached. When the correct horizontal position on said scan line is achieved data is displayed.

A Y register holds the value of a valid scan line (one containing picture information) and an X register holds the value of the horizontal position of the picture information. A control logic arrangement generates signals to load the registers. Video is provided from a parallel-in, serial-out shift register, the output of which is converted to an analog composite video signal.

Accordingly, the arrangement includes a memory address counter, the aforenoted X, Y and video shift registers, a pair of comparators and a memory device. The memory device contains a list of video words to be displayed, in order from the top to the bottom of the display screen, and from left to right on each display scan line. The first word is the Y value, or scan line number, on which the first video (top of screen) appears. The next word is the X value on that scan line, then the pixel data. The comparators are used to compare the X and Y values, which are loaded into their respective registers, to the outputs of horizontal and vertical counters which generate raster timing. When the correct scan line is reached the arrangement is in a waiting mode for the correct X position on the scan line. The video data is then loaded into the shift register. For data which is repeated on more than one scan line, such as a vertical line, the circuit has the capability of looping back to the same data so as to save additional memory.

DETAILED DESCRIPTION OF THE INVENTION

Figure 1:
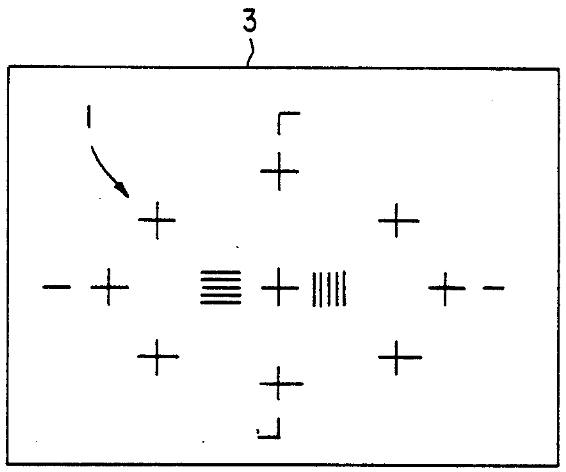
FIG. 1 is a diagrammatic representation of a typical raster pattern display for which the present invention may be used.

With reference to FIG. 1, a typical image pattern for testing positional accuracy is designated by the numeral 1. It will be readily recognized that the image shown in the Figure is comprised mostly of blank space and would waste a large portion of a bit-map. However, using a look-ahead arrangement as herein disclosed and to be hereinafter described for displaying the symbols shown in the Figure on a screen 3 saves significant memory, as will be discerned from the following description of the invention.

Figure 2:
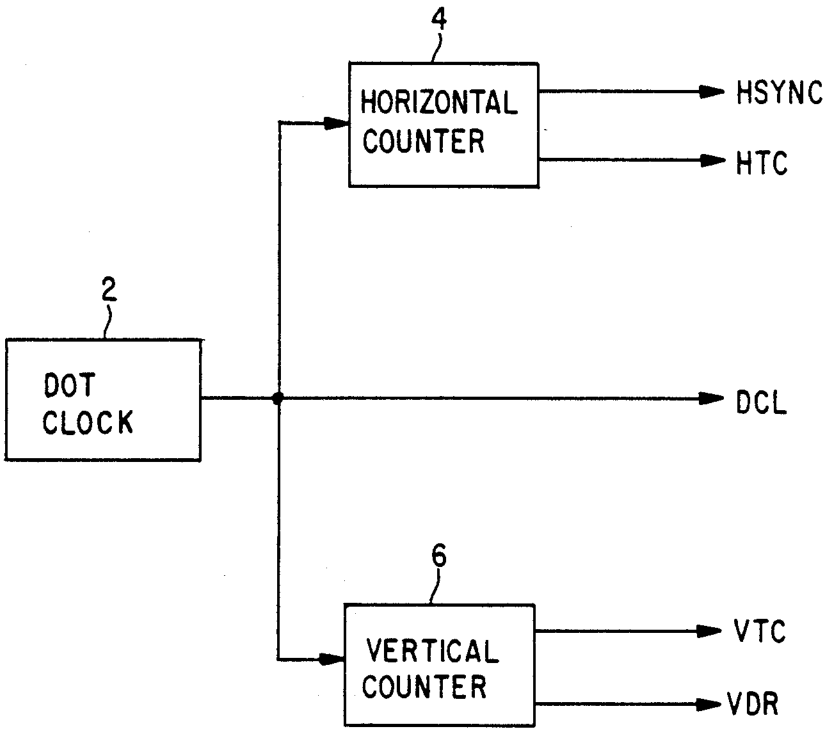
FIG. 2 is a block diagram illustrating a feature of the invention including a DOT clock and the generation of signals thereby.

With reference to FIG. 2 a DOT clock of the type well known in the art is designated by the numeral 2. DOT clock 2 provides an output signal DCL. Signal DCL is applied to a conventional horizontal counter 4 and to a likewise conventional vertical counter 6.

Horizontal counter 4 responds to signal DCL for providing a horizontal synchronizing signal HSYN and a horizontal timing count signal HTC. Vertical counter 6 responds to signal DCL and provides a vertical timing count signal VTC and a vertical drive signal VDR.

Figure 3:
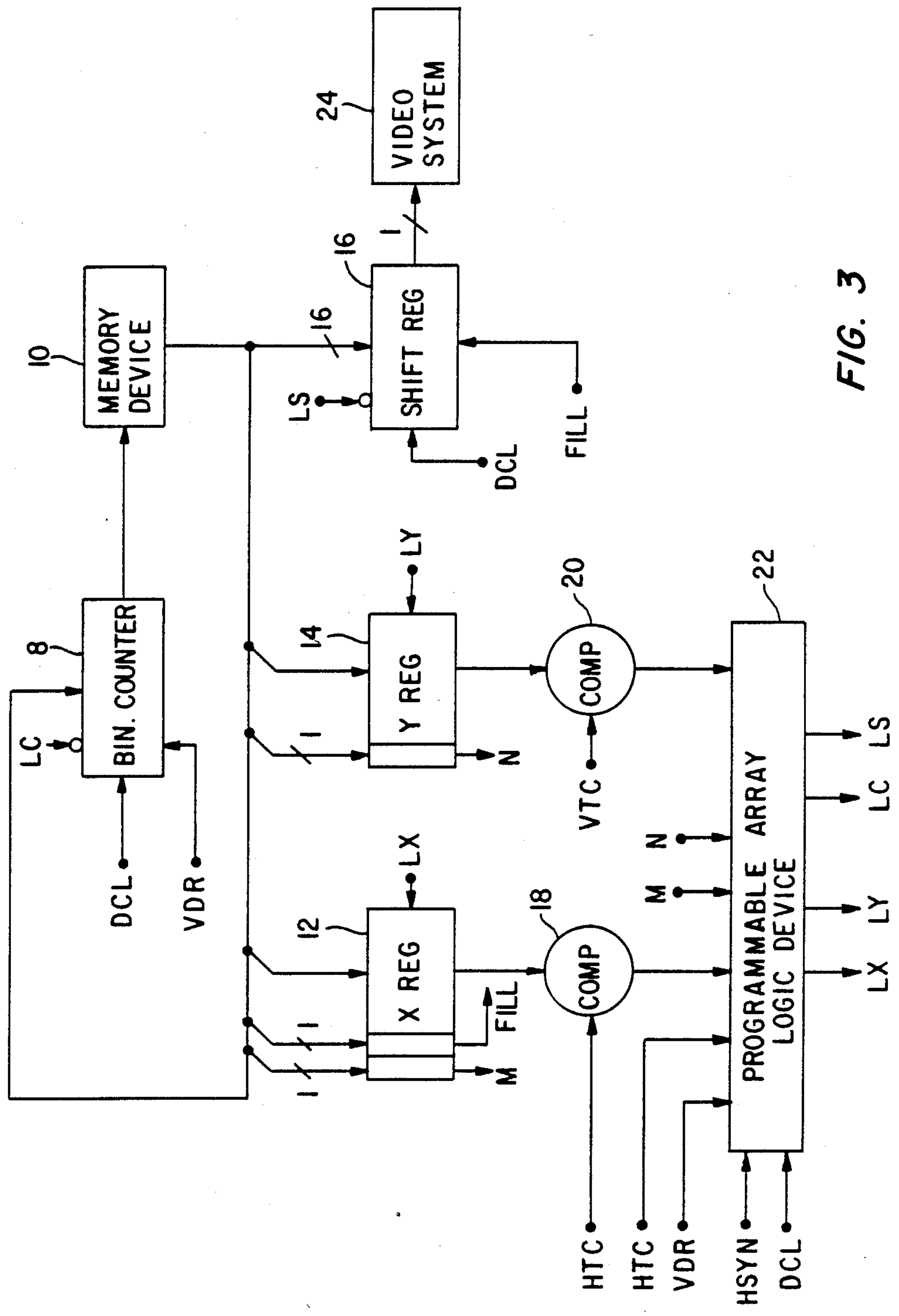
FIG. 3 is a block diagram illustrating the arrangement of the invention and the utilization of the signals generated by the DOT clock of FIG. 2.

With reference to FIG. 3, an arrangement is shown including a binary counter 8, a memory device 10, an X register 12, a Y register 14, a shift register 16, a comparator 18, a comparator 20, a programmable array logic device 22, and a video system 24, all of which are of a conventional type well known in the art.

Programmable array logic device 22 receives signal DCL from DOT clock 2, signal HYSN from horizontal counter 4, signal HTC from horizontal counter 4 and signal VDR from vertical counter 6. Programmable array logic device 22 receives signals from comparators 18 and 20, and receives a flag bit M from X register 12 and a flag bit N from Y register 14. Programmable array logic device 22 responds to the received signals for providing signal LX for loading X register 12, signal LY for loading Y register 14, signal LS for loading shift register 16 and signal LC for loading binary counter 8.

Binary counter 8 receives signal DCL from DOT clock 2 and signal VDR from vertical counter 6 and is loaded by signal LC from logic device 22. Binary counter 8 applies an output to memory device 10.

Memory device 10 applies outputs to X register 12 which is loaded by signal LX, to Y register 14 which is loaded by signal LY and to shift register 16 which is loaded by signal LS. The output from memory device 10 is applied back to binary counter 8. X register 12 provides flag bit M and a FILL bit. Y register 14 provides flag bit N. Shift register 16 receives bit DCL from DOT clock 2 and provides an output which is applied to a video system 24. Shift register 16 receives the FILL bit from X register 12 which causes it to shift out a constant logic "high" signal for affecting video system 24 to provide constant video.

To summarize the invention as so far described, the key to saving memory, which is a primary object of the invention, is through the use of comparators 18 and 20 which allow a prediction as to which scan line there is valid display information (active video). Thus, the arrangement remains in a wait state until a valid scan line is reached. At that point the arrangement waits until the correct horizontal position on the scan line is reached to display data. Y register 14 holds the value of a valid scan line (one containing picture information) and X register 12 holds the value of the horizontal position of the picture information. Programmable array logic device 22 generates the signals as aforenoted to load the several registers and counter 8. Video is achieved from parallel-in, serial-out shift register 16, the output of which is converted to an analog composite video signal through video system 24 which may include a suitable video amplifier and a monitor screen as is well known in the art.

Memory device ,10 in FIG. 3 contains an ordered list of video words. Since the raster display works from the top to the bottom of a display screen, the words in memory 10 are ordered in the same way. That is to say, the first word in memory contains the number of the first line containing picture information. This Y value word is loaded into Y register 14. When vertical timing counter 6 (FIG. 2) reaches this value, X register 12 will be loaded with the next word (X value word) memory. Following the X value word is the actual video data word, each bit of which represents one pixel. This word is loaded into shift register 16 when horizontal timing count HTC equals the value in X register 12.

A flag bit (as aforementioned) is associated with each X and Y word in memory. Bit N, part of the Y word, is used to signify whether or not the data is to be displayed on a single scan line, or is to be repeated for a number of scan lines. If N is set, then the data is to be repeated and the next word of memory is the line number where the data ends.

Figure 6:
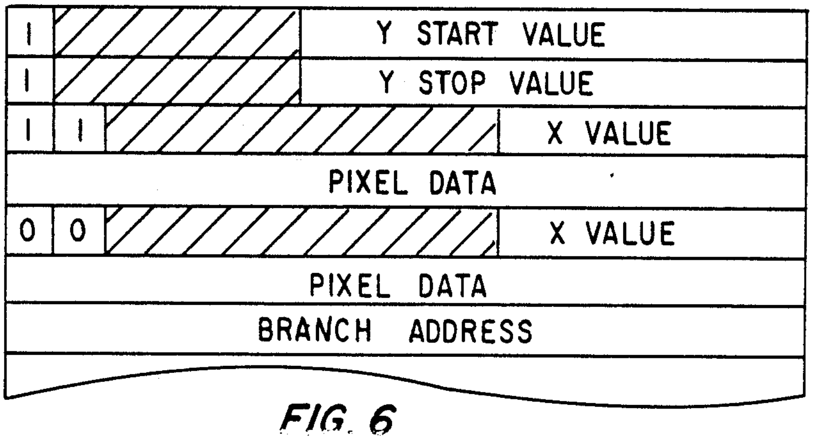
FIG. 6 is a bar chart representation illustrating an ordered list of data, wherein the flag bit N equals 1.

With reference to FIG. 6, this creates a Y START and a Y STOP. If N is not set, then the data following is to be displayed on only one scan line.

Bit M, part of the X word, when set, signifies that there is more information following for the same scan line. If bit M is not set, then the video at that X location is the last video for that scan line. Thus, the hardware involved will wait for the next valid scan line. A second bit of the X word, designated as the FILL bit as aforenoted forces shift register 16 to provide a constant logic "high" output to turn on video system 24 and keep it on until the next X value is reached, thereupon turning the video system off. With this arrangement a horizontal line segment of any length can be displayed with only two X words as will now be understood.

Figure 4:
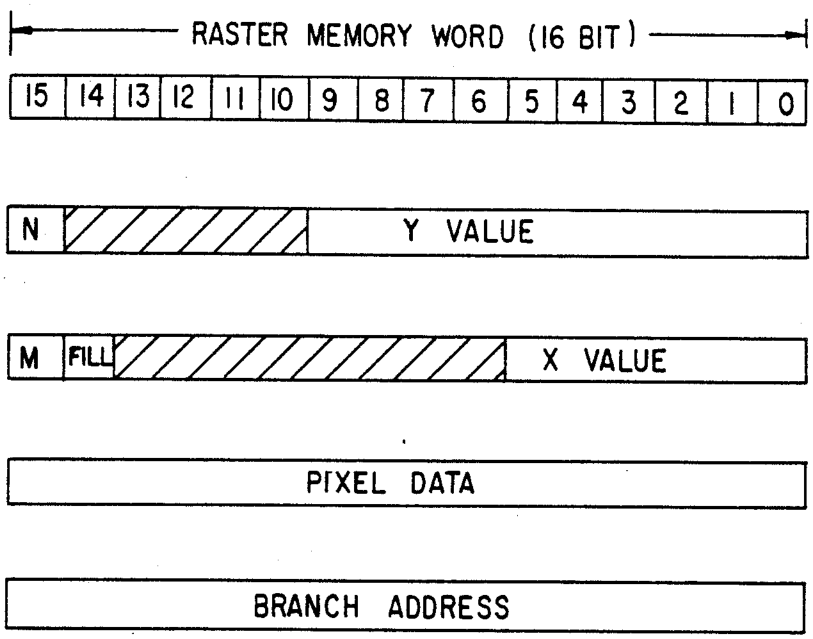
FIG. 4 is a bar chart representation illustrating a raster memory word format according to the invention.

FIG. 4 shows the format for the data words in memory. For illustrative purposes a word width of 16 bits is used. The width of the X and Y words depends on the resolution required. The data word occupies the full 16 bits. Since, for purposes of illustration, a monochromatic display is being considered, each bit in the data word represents one pixel and one data word represents 16 pixels. Each scan line is divided into a number of groups of 16, with each group corresponding to a unique value of X. Thus, a display with a horizontal resolution of 640 would be represented as forty groups of sixteen pixels each.

Figure 5:
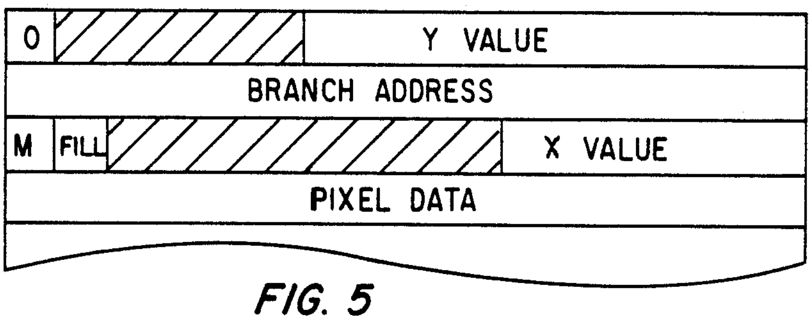
FIG. 5 is a bar chart representation illustrating an ordered list of data, wherein a flag bit N for an Y-word in memory equals 0.

FIG. 5 shows an ordered list of data for an illustrative case where flag bit N=0. With N=0 the related information is displayed on only one scan line. The first word is the Y value, followed by a BRANCH ADDRESS. This BRANCH allows the hardware to jump to the next group of data, if the Y value previously called out is not in the current display field. It is to be noted that for interlaced video displays each frame consists of two fields. Half of the lines are displayed in the first 1/60 of a second. The beam then retraces to the top of the display screen and displays the other half of the lines in the next 1/60 of a second. Following the BRANCH is the X location, then the pixel data.

FIG. 6 shows an ordered list of data for an illustrative case were flag bit N=1. The first word is the aforenoted Y START value. This is followed by the aforenoted Y STOP value, then the X value, and then pixel data information which will be repeatedly displayed on the scan lines covering Y START to Y STOP. The BRANCH instruction here points back to the first X value to allow looping on the same data. This example, utilizing the FILL bit, will display a filled in rectangle with dimensions specified by the respective X and Y values.

Figure 7:
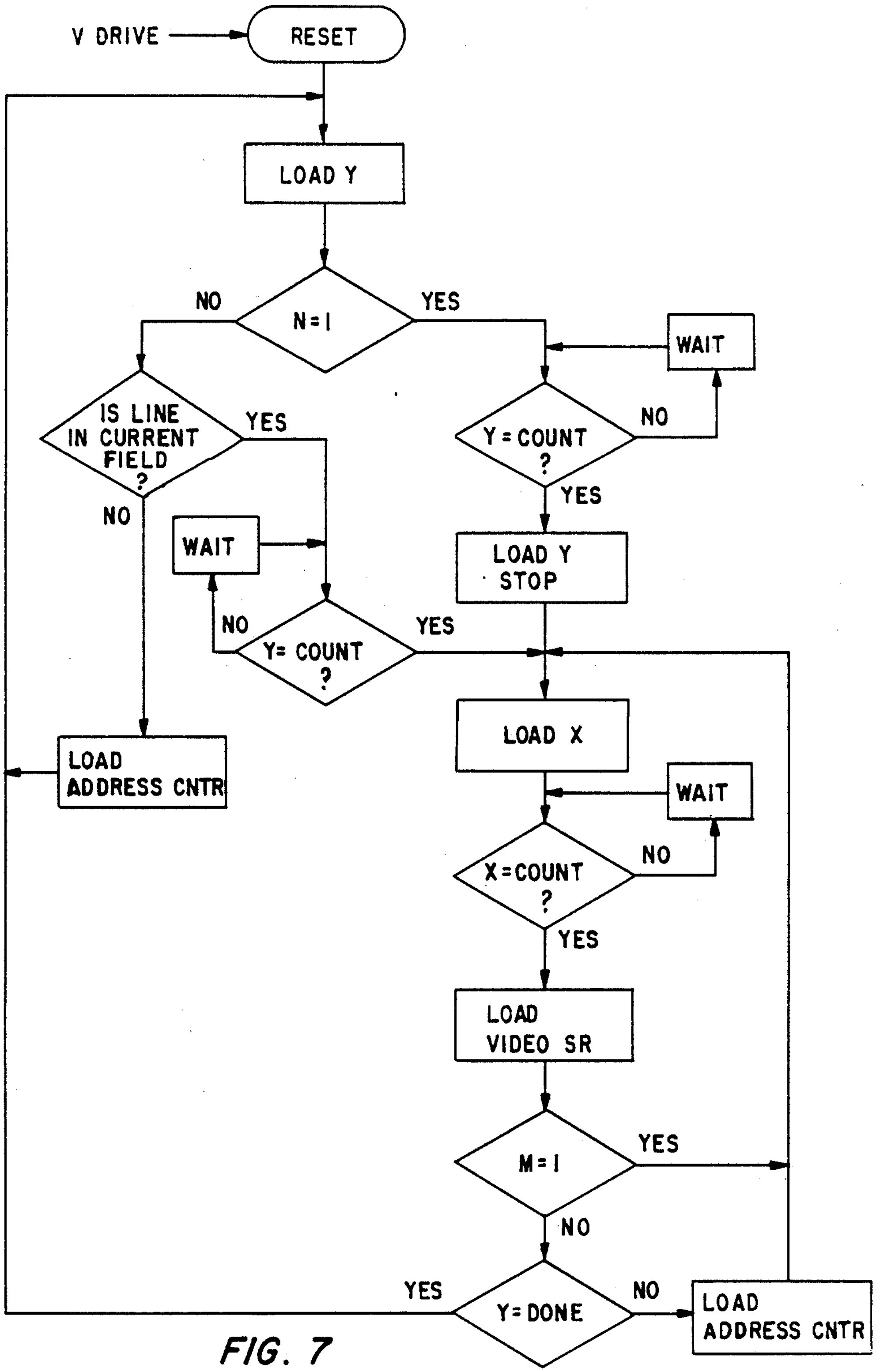
FIG. 7 is a raster generation flow diagram illustrating the invention.

An operational flow diagram for the arrangement described is shown in FIG. 7. It is significant to note that the system always begins in a re-set state achieved by a vertical retrace (signal VDR). This also sets counter 8 (FIG. 3) to 0, to point to the beginning of data at Y DONE, N=1 and Y STOP=count in vertical counter 6, or N=0.

Figure 8:
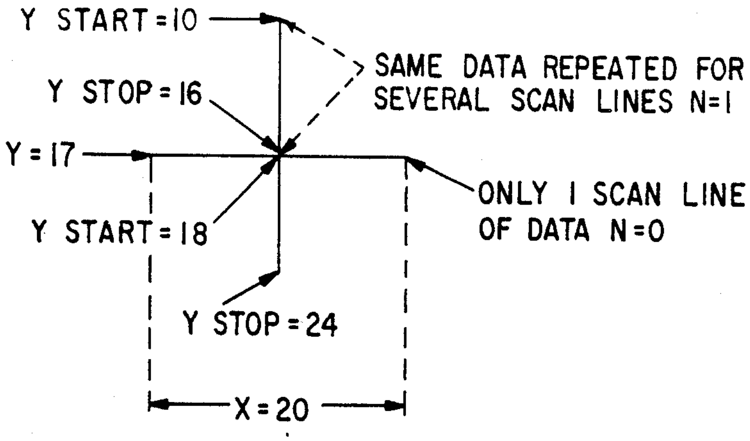
FIG. 8 is a cross-hair symbol and the parameters associated therewith in accordance with the invention.

A simple cross hair symbol and its associated parameters are shown for illustrative purposes in FIG. 8. Thus, the symbol begins on line 10 and is centered at X=20. Upon completion of vertical retrace the first event to occur will be loading of Y register 12, with Y START=10.

Figure 9:
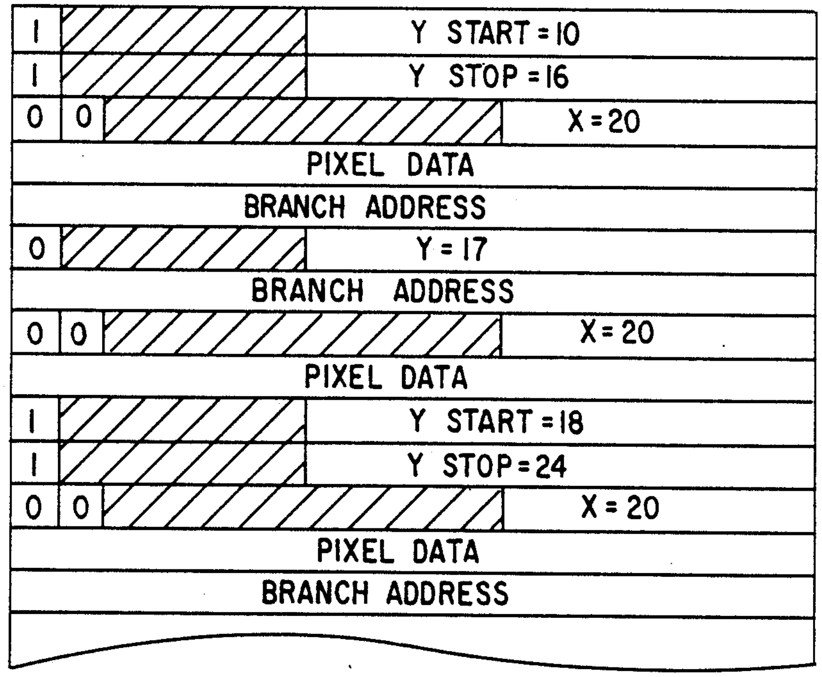
FIG. 9 is a bar chart representation illustrating the memory required to draw the cross hair symbol shown in FIG. 8.

FIG. 9 shows the memory required to draw the cross hair symbol shown in FIG. 8. After waiting until the 10th line, the described arrangement will be ready to display video and will load Y register 14 with Y STOP=16. With reference to the flow chart shown in FIG. 7, the next step is to load X register 12 with X=20. When the horizontal count reaches 20 the data word will be loaded into shift register 16. This will be repeated for the lines Y START to Y STOP by loading the BRANCH value into binary counter 8. Note that in FIG. 9 the BRANCH points back to the first X word.

At the point where the vertical count is greater than Y STOP, the next word, Y=17 will be loaded. Since this value pertains to the horizontal part of the cross hair symbol, flag bit N of the Y word is set to 0, indicating that the following video information falls on one scan line as opposed to the vertical part which covers several scan lines. Provided that the line at Y=17 is in the current field, the disclosed arrangement will skip BRANCH and go on to load X register 12 with X=20. For simplicity, the cross hair symbol in the example is sixteen pixels wide so the data word following the X word is all "1's." Thus, when the horizontal count equals 20 the data word will be loaded into shift register 16. The arrangement will then proceed to load the next Y START, and display the lower vertical part of the cross hair symbol from lines 18 to 24.

A program may be easily written by one skilled in the programming arts to "compile" the various words such as Y START, Y STOP, etc., and format the data for download to memory, the same not being a part of the present invention. As long as the data is entered in order from the top of the screen to the bottom and from left to right on each scan line, a display of any complexity can be generated. However, it will be understood that the arrangement described is less efficient when displaying, for example, a full screen of text.

The invention has been described specifically for use with a monochromatic display with a two level video, i.e., on or off. However, displaying a shades-of-gray pattern would be quite simple by applying the data word to a digital to analog converter instead of shifting it out serially, as is herein the case. Similarly, the arrangement can be used to generate color test patterns For example, if an 8 bit shift register is used for video, then the remaining 8 bits of the 16 bit data word would be used to select up to 256 colors. Producing a color-bar test pattern requires only a few memory locations as will now be understood.

With the continuing development of raster display systems a need for specific video test equipment exists Because new displays are achieving very high resolution, larger amounts of bit-map memory are required to display test patterns. The arrangement described herein is advantageous in that it is independent of screen size and allows for flexible test patterns, with a fraction of the memory needed for a bit-map otherwise generated.

The several components of the invention such as shown in FIGS. 2 and 3 are commercially available components well known to those skilled in the art. The novelty of the invention resides not in the components themselves but in the arrangement thereof as will be readily understood.

With the above description of the invention in mind reference is made to the claims appended hereto for a definition of the scope of the invention.

What is claimed is:

1. A memory saving arrangement for displaying raster test patterns, comprising:

memory means storing a list of video words to be displayed, in order from the top to the bottom of a display screen, and from left to right on each display scan line;

means for addressing the memory means whereby said memory means provides a first digital word representing the Y value, i.e. scan line numbers on which the first video word appears on the top of the screen, a second digital word representing the X value on that scan line, and then provides pixel data;

the X value digital word having a bit which signifies whether there is more data following for the same scan line and whether the X value is the last data for that scan line, and the Y value digital word having a bit which signifies whether the pixel data is displayed on a single scan line and whether said data is to be repeated on a plurality of scan lines;

first counter means for generating a horizontal timing count signal;

second counter means for generating a vertical timing count signal;

means for comparing the X value word to the horizontal timing count signal and generating a first comparison signal;

means for comparing the Y value word to the vertical timing count signal and generating a second comparison signal;

means responsive to the first and second comparison signals for rendering the arrangement in a "wait" mode when a correct scan line is reached and for maintaining the arrangement in the "wait" mode until the correct X value on that scan line is reached;

means for receiving the pixel data at the end of the "wait" mode and for generating corresponding output; and means connected to the receiving means and responsive to the output therefrom for displaying an analog composite video signal.

2. An arrangement as described by claim 1, wherein:

the X value digital word has an other bit which is effective by turning the means for displaying an analog composite video signal on and off; and said analog composite video signal means connected to the memory means and responsive to the X value word for being turned on and maintained on until the next X value is reached and thereupon being turned off, whereby an X value segment of any length can be displayed with only two X value words.

3. A memory saving method for displaying raster test patterns, comprising:

storing a list of video words in a memory means in order from the top to the bottom of a display screen and from left to right on each display scan line;

addressing the memory means for providing a first digital word representing the Y value, i.e. scan line number on which the first video word appears on the top of the screen, a second digital word representing the X value on that scan line, and then providing pixel data;

the X value digital word having a bit which signifies whether there is more data following for the same scan line and whether the X value is the last data for the scan line, and the Y value digital word having a bit which signifies whether the pixel data is displayed on a single scan line and whether said data is to be repeated on a plurality of scan lines;

generating a horizontal timing count signal;

generating a vertical timing count signal;

comparing the X value word to the horizontal timing count signal for generating a first comparison signal;

comparing the Y value word to the vertical timing count signal for generating a second comparison signal;

responding to the first and second comparison signals for rendering the arrangement in a "wait" mode when a correct scan line is reached and maintaining the arrangement in the "wait" mode until the correct X value on the scan line is reached;

receiving the pixel data at the end of the "wait" mode and generating a corresponding output; and responding to said output for displaying an analog composite video signal.

4. A method as described by claim 3, including:

the X value digital word having an other bit for turning the analog composite video signal on and off; and responding to the X value word for turning said analog composite video signal on and maintaining said signal on until reaching the next X value and thereupon turning said signal off for displaying an X value segment of any length with only two X value words.

5. A memory saving arrangement for displaying raster test patterns, comprising:

memory means storing a list of video words to be displayed, in order from the top to the bottom of a display screen, and from left to right on each display scan line;

means for addressing the memory means whereby said memory means generates a first digital word representing the Y value, i.e. scan line numbers on which the first video word appears on the top of the screen, a second digital word representing the X value on that scan line, and then generates pixel data;

first counter means for generating a horizontal timing count signal;

second counter means for generating a vertical timing count signal;

means for comparing the X value word to the horizontal timing count signal and generating a first comparison signal;

means for comparing the Y value word to the vertical timing count signal and generating a second comparison signal;

means responsive to the first and second comparison signals for rendering the arrangement in a "wait" mode when a correct scan line is reached and for maintaining the arrangement in the "wait" mode until the correct X value on that scan line is reached;

means for receiving the pixel data at the end of the "wait" mode and for generating a corresponding output;

means connected to the receiving means and responsive to the output therefrom for displaying an analog composite video signal;

the X value word having a bit which is effective for turning the means for displaying an analog video signal on and off; and said analog composite video signal means connected to the memory means and responsive to the X value word for being turned on and maintained on until the next X value is reached and thereupon being turned off, whereby an X value segment of any length can be displayed with only two X value words.

6. A memory saving method for displaying raster test patterns, comprising:

storing a list of video words in a memory means in order from the top to the bottom of a display screen and from left to right on each display scan line;

addressing the memory means for generating a first digital word representing the Y value, i.e. scan line number on which the first video word appears on the top of the screen, a second digital word representing the X value on that scan line, and then generating pixel data;

generating a horizontal timing count signal;

generating a vertical timing count signal;

comparing the X value word to the horizontal timing count signal for generating a first comparison signal;

comparing the Y value word to the vertical timing count signal for generating a second comparison signal;

responding to the first and second comparison signals for rendering the arrangement in a "wait" mode when a correct scan line is reached and maintaining the arrangement in the "wait" mode until the correct X value on the scan line is reached;

receiving the pixel data at the end of the "wait" mode and generating a corresponding output;

responding to said output for displaying an analog composite video signal;

generating the X value digital word with a bit for turning the analog composite video signal on and off; and responding to the X value word for turning said analog composite video signal on until reaching the next X value and thereupon turning said signal off for displaying an X value segment of any length with only two X value words.

* * * * *